US009313110B2

(12) United States Patent
Branson et al.

(10) Patent No.: US 9,313,110 B2
(45) Date of Patent: Apr. 12, 2016

(54) MANAGING PROCESSING BRANCHES IN AN OPERATOR GRAPH

(71) Applicant: International Business Machines Corporation, Armonk, NY (US)

(72) Inventors: Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 14/160,624

(22) Filed: Jan. 22, 2014

(65) Prior Publication Data

US 2015/0207751 A1    Jul. 23, 2015

(51) Int. Cl.
*G06F 15/16* (2006.01)
*H04L 12/26* (2006.01)
*H04L 12/803* (2013.01)
*H04L 12/911* (2013.01)

(52) U.S. Cl.
CPC .............. *H04L 43/08* (2013.01); *H04L 47/125* (2013.01); *H04L 47/70* (2013.01); *H04L 43/0852* (2013.01); *H04L 43/16* (2013.01)

(58) Field of Classification Search
CPC ........ H04L 12/2618–12/2621; H04L 12/2628; H04L 47/10–47/127
See application file for complete search history.

(56) References Cited

U.S. PATENT DOCUMENTS

| | | | |
|---|---|---|---|
| 7,613,848 B2 | 11/2009 | Amini et al. | |
| 7,644,110 B2 | 1/2010 | Nishizawa et al. | |
| 7,830,806 B2 * | 11/2010 | Rayner | H04L 12/24 370/216 |
| 8,095,690 B2 | 1/2012 | Kashiyama et al. | |
| 8,117,331 B2 | 2/2012 | Gedik et al. | |
| 8,214,521 B2 | 7/2012 | Takagi et al. | |
| 8,239,828 B2 | 8/2012 | Liu et al. | |
| 2002/0161884 A1 * | 10/2002 | Munger | H04L 61/2007 709/224 |

(Continued)

FOREIGN PATENT DOCUMENTS

WO    2011100646 A1    8/2011

OTHER PUBLICATIONS

Amini, L., et al, "Adaptive Control of Extreme-scale Stream Processing Systems", Proceedings of the 26th IEEE International Conference on Distributed Computing Systems (ICDS'06), 2006. pp. 1-7, © 2006 IEEE. DOI: 10.1109/ICDCS.2006.13.

(Continued)

*Primary Examiner* — Brendan Higa
(74) *Attorney, Agent, or Firm* — Mark G. Edwards; Feb R. Cabrasawan

(57) ABSTRACT

Embodiments of the disclosure provide a method and system for processing data such as a stream of tuples. One embodiment is directed toward a method for managing a stream of tuples. The method can include receiving the stream of tuples to be processed by a plurality of stream operators operating on one or more computer processors. The method can include routing the stream of tuples to a plurality of output ports, the output ports each communicate with a processing branch. The method can include receiving performance data of the stream of tuples from a measuring stream operator that measures the processing branch. The method can include determining weights to assign to each output port based on the performance data. The method can also include modifying the routing of the stream of tuples through the plurality of output ports as a function of the weight of each output port.

12 Claims, 8 Drawing Sheets

(56) References Cited

U.S. PATENT DOCUMENTS

| | | | |
|---|---|---|---|
| 2005/0055439 A1* | 3/2005 | Piccirilli | H04L 43/062 709/224 |
| 2007/0288635 A1* | 12/2007 | Gu | G06F 17/30985 709/226 |
| 2008/0270640 A1 | 10/2008 | Gedik et al. | |
| 2009/0319687 A1* | 12/2009 | Goldstein | G06F 9/5083 709/241 |
| 2011/0119270 A1 | 5/2011 | Jin et al. | |
| 2011/0314019 A1 | 12/2011 | Jimenez Peris et al. | |
| 2012/0215934 A1 | 8/2012 | Barsness et al. | |
| 2012/0218268 A1 | 8/2012 | Accola et al. | |
| 2013/0031124 A1 | 1/2013 | Santosuosso et al. | |
| 2013/0031282 A1 | 1/2013 | Amini et al. | |
| 2013/0031335 A1 | 1/2013 | Santosuosso et al. | |
| 2013/0054538 A1* | 2/2013 | Cradick | G06F 9/5022 707/687 |
| 2013/0080654 A1 | 3/2013 | Branson et al. | |
| 2013/0124668 A1 | 5/2013 | Idziorek et al. | |
| 2014/0304545 A1* | 10/2014 | Chen | G06F 11/1471 714/4.3 |

OTHER PUBLICATIONS

Ballard, C., et al., "IBM InfoSphere Streams: Harnessing Data in Motion", IBM Redbooks, International Technical Support Organization, Sep. 2010, First Edition, 360 pages, © International Business Machines Corporation 2010. http://www.redbooks.ibm.com/abstracts/sg247865.html.

Kendai, B., "Runtime Optimization and Load Shedding in Maystream: Design and Implementation", Sumbitted in Partial Fulfillment of Requirements for the Degree of master of Science in Computer Science and Engineering, University of Texas at Arlington. Dec. 2006, Copyright © by Balakumar K. Kendai 2006.

Pham, T., et al., "Self-managing load shedding for data stream management systems", The 8th International Workshop on Self-Managing Database Systems (SMDB'13), pp. 1-7, Apr. 2013.

Jiang et al., "Scheduling Strategies for Processing Continuous Queries over Streams," In: Key Technologies for Data Management, H. Williams & L. MacKinnon (Eds.), BNCOD 2004, LNCS, vol. 3112, pp. 16-30, © Springer-Verlag Berlin Heidelburg 2004.

Xu, "Feedback Control Theory and Processing System Log Streams," Master Thesis, EECS Department, UC Berkeley, Dec. 2005, 77 pages, http://iiis.tsinghua.edu.cn/~weixu/files/dsom05.pdf.

* cited by examiner

MANAGING PROCESSING BRANCHES IN AN OPERATOR GRAPH

BACKGROUND

This disclosure generally relates to stream computing, and in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

One embodiment is directed toward a method for managing a stream of tuples. The method can include receiving the stream of tuples to be processed by a plurality of stream operators operating on one or more computer processors. The method can include routing the stream of tuples to a plurality of output ports, the output ports each communicate with a processing branch. The method can include receiving performance data of the stream of tuples from a measuring stream operator that measures the processing branch. The method can include determining weights to assign to each output port based on the performance data. The method can also include modifying the routing of the stream of tuples through the plurality of output ports as a function of the weight of each output port.

Another embodiment is directed toward a method for managing a stream of tuples. The method can include identifying a measuring stream operator for each processing branch. The method can include receiving, at the measuring stream operator, the stream of tuples processed by a split operator through a plurality of processing branches with each processing branch having one or more stream operators, and each stream operator operating on one or more computer processors. The method can include measuring performance data of each tuple from the stream of tuples at the measuring stream operator. The method can include determining a weight to assign to each processing branch based off of the performance data. The method can include determining a routing method for the split operator based off of the weight. The method can also include transmitting the routing method to the split operator.

Another embodiment is directed toward a system for processing a stream of tuples, each tuple having one or more attributes. The system can include one or more processing elements operating on one or more computer processors configured to processes the attributes from the stream of tuples, each processing element having one or more stream operators. The system can also include a split operator from the one or more processing elements configured to route the stream of tuples, using a routing method, through a plurality of processing branches, each processing branch having one or more stream operators. The system can also include a measuring stream operator that is configured to receive the stream of tuples from one or more processing branches from the plurality of processing branches. The measuring stream operator can be configured to measure performance data of each tuple from the stream of tuples. The measuring stream operator can be configured to determine a weight to assign to each processing branch based off of the performance data. The measuring stream operator can be configured to determine the routing method for the split operator based off of the weight. The measuring stream operator can be configured to transmit the routing method to the split operator.

BRIEF DESCRIPTION OF THE DRAWINGS

Like reference numbers and designations in the various drawings indicate like elements.

DETAILED DESCRIPTION

Figure 1:
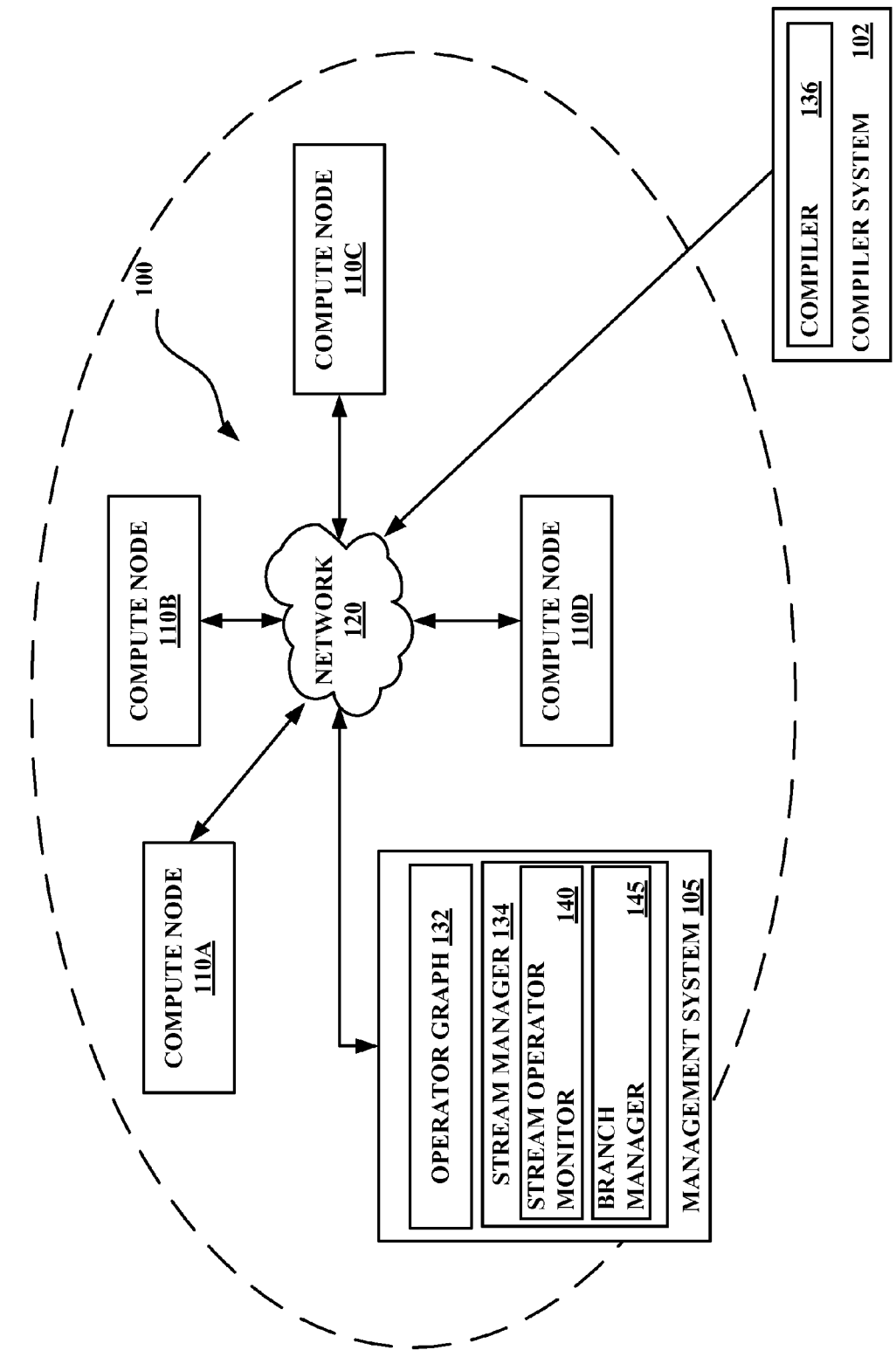
FIG. 1 illustrates a computing infrastructure configured to execute a stream computing application according to various embodiments.

Aspects of the present disclosure are generally directed to managing a stream of tuples from a split operator. The split operator can split the processing of the stream of tuples into two or more processing branches. The split operator can modify the routing of the stream of tuples based on the performance of a tuple which can be measured using a measuring stream operator at any point along the processing branch. Although not necessarily limited thereto, embodiments of the present disclosure can be appreciated in the context of streaming data and problems relating to routing tuples in the stream of data. Throughout this disclosure, the term stream operator may be abbreviated "S.O." or "OP"

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

Stream operators may transmit a tuple in an operator graph (described further herein). Generally, the operator graph can have a plurality of stream operators that produce a particular end result, e.g., calculate an average. The operator graph can have a splitting stream operator also referred to as a split operator. The split operator can be a stream operator that has output ports. Each output port on the split operator can route tuples to a plurality of processing branches. The split operator can route the tuples to the processing branches using a variety of routing methods, e.g., randomly, based on the type of processing that a processing branch performs, in intervals, etc.

Each processing branch can have one or more stream operators configured to perform a particular calculation and produce a different processing result. For example, if a processing branch is configured to an average calculation. Then the processing branch can have a stream operator configured to count each attribute value in a tuple, and another stream operator calculate a total of all attribute values.

The processing branches do not have to be equivalent and one processing branch can perform a different type of processing than another processing branch. Embodiments of the disclosure can have processing branches performing duplicative calculations or different calculations. For purposes of clarity, examples will be used that describe each processing branch from the split operator as duplicative processing.

In the event where the processing branches do not produce the same processing result, then a stream manager can classify each processing branch as odd or even. For example, the split operator can then distribute "odd" tuples to only odd tuple ports, e.g. (s1;s2;s3;s4)=Split(i). Work would go to s1 or s3 and, in this case, the work would be duplicative on s1 and s3 and the work performed on s2 and s4 would be duplicative but different than s1 and s3.

A measuring stream operator can measure the performance of a particular processing branch. The measuring stream operator can be determined by an optimal location to observe the performance of a particular processing branch. According to various embodiments, the measuring stream operator can be the stream operator where at least two of the processing branches combine. When the processing branches are non-duplicative, or the processing branches do not combine, then the measuring stream operator can be after a substantial bottleneck in the processing branch. For example, if stream operators downstream from the split operator have tuple queues of 30 tuples/second, and a stream operator further downstream has a queue of 5 tuples/second, then the stream operator with the queue of 5 tuples/second can be the measuring stream operator.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 3:
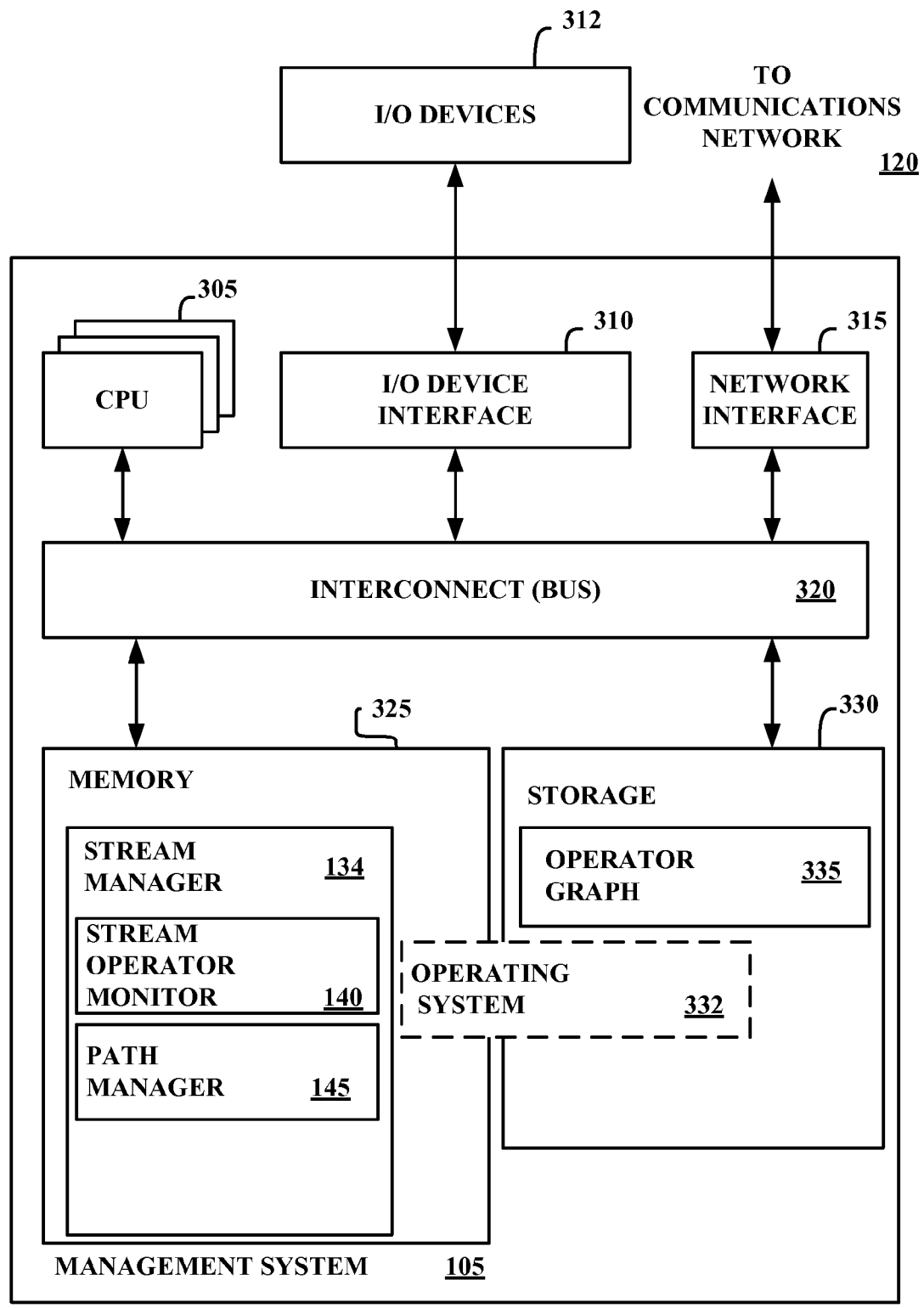
FIG. 3 illustrates a more detailed view of the management system of FIG. 1 according to various embodiments.

The management system 105 can control the management of the compute nodes 110A-110D (discussed further on FIG. 3). The management system 105 can have an operator graph 132 with one or more stream operators and a stream manager 134 to control the management of the stream of tuples in the operator graph 132. The stream manager 134 can have components such as a stream operator monitor 140 and a branch manager 145. The stream operator monitor 140 can determine the measuring stream operator and capture the performance data from the measuring stream operator. The branch manager 145 can determine the tuple placement throughout the various processing branches.

Generally, the performance data can be any type of data that indicates performance of a stream operator. The performance data can include a total processing time from the split operator to the measuring stream operator. To measure processing time, the split operator can introduce a timestamp to the metadata of the tuple which can be read by the measuring stream operator to determine the time elapsed. The performance data can also include a CPU or memory usage of the processing branch.

In various embodiments, the stream operator monitor 140 can monitor the measuring stream operator for the performance data. Once the performance data is measured, the results of the performance data can be sent to the stream operator monitor 140, which can further forward the results to the split operator or the branch manager 145. The stream operator monitor 140 can communicate to the stream manager 134 so that the stream manager 134 can modify the routing of the stream of tuples.

The branch manager 145 can be configured to determine the routing of the stream of tuples at the split operator. In various embodiments, the branch manager 145 can determine the routing by analyzing the performance data obtained from the stream operator monitor 140. The branch manager 145 can perform a variety of tuple routing methods. For example, the branch manager 145 can initiate a round-robin routing method to cycle tuples through two processing branches in an alternating fashion. A goal of the branch manager 145 can be to even out the processing times of the tuples throughout the processing branches.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
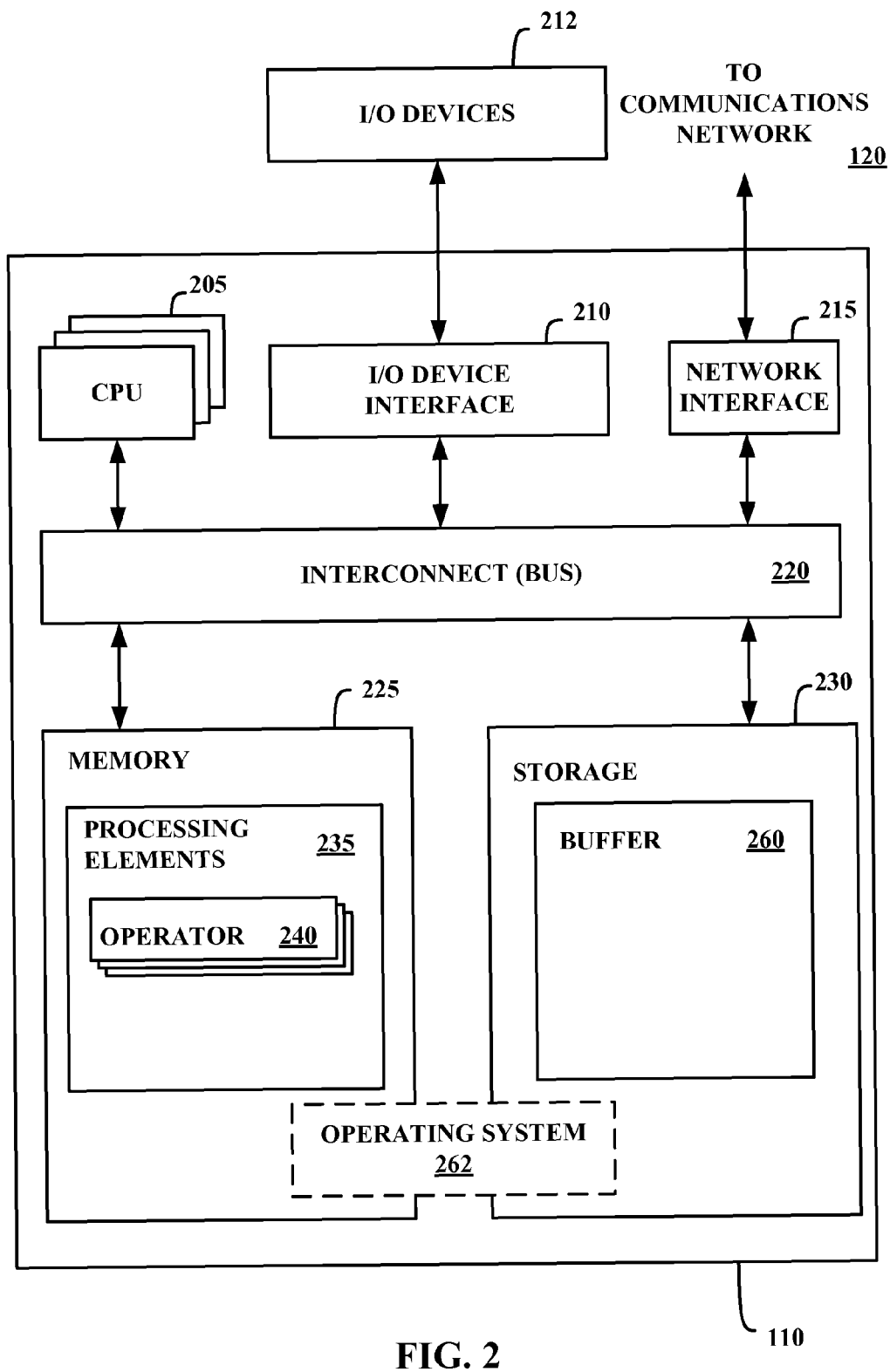
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The stream manager 134 can have software features that manage a processing branch. In various embodiments, the stream manager 134 may have a stream operator monitor 140, and a branch manager 145, discussed herein.

Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
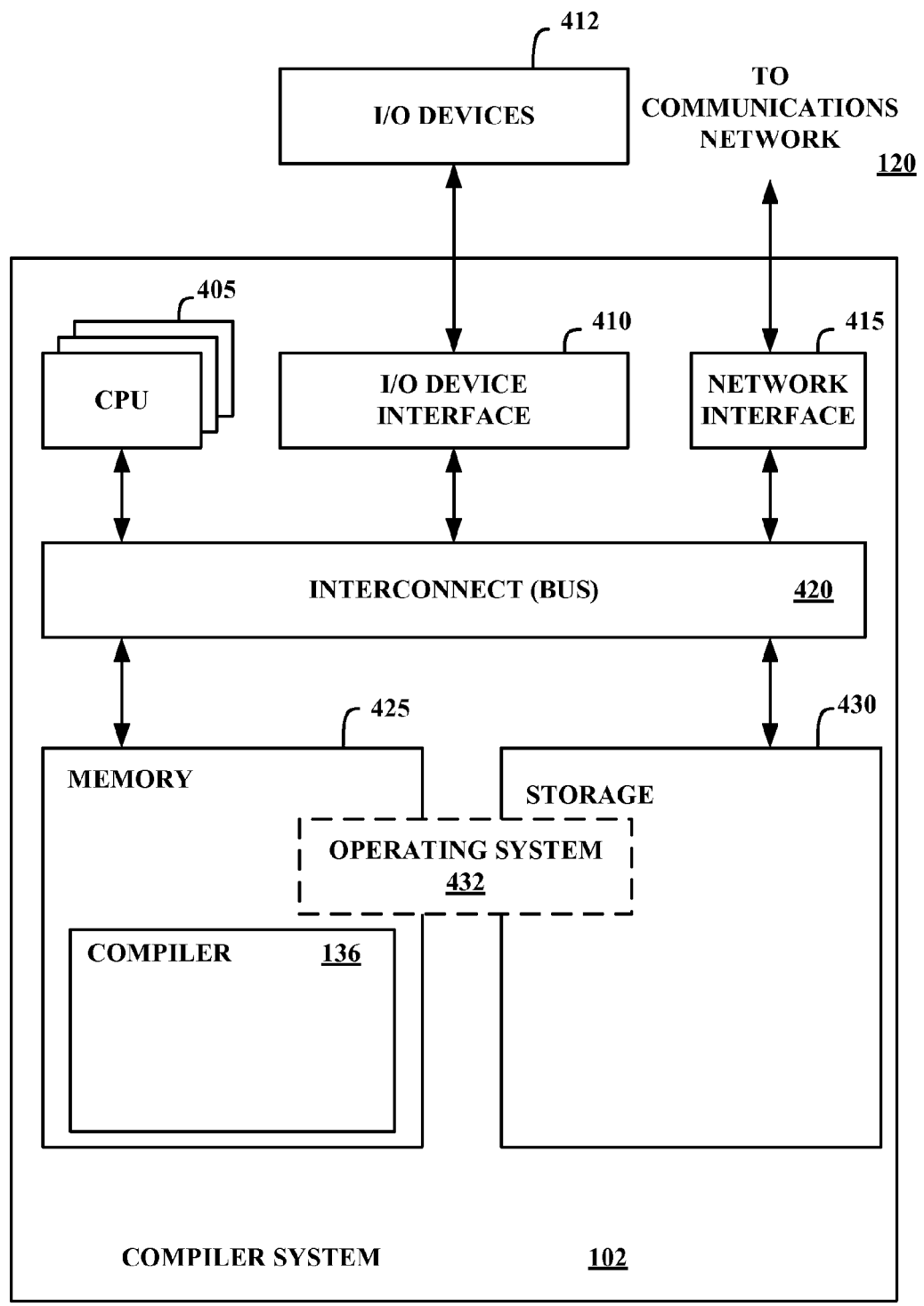
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

In various embodiments, the compiler 136 can include the windowing operation on a particular stream operator on the operator graph 335 during compile time by writing the windowing operation onto a particular stream operator. In various embodiments, the windowing operation may be included as a default and activated from the stream manager 134. The windowing operation may also be included as an optional feature for a particular stream operator and may be activated by the application.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
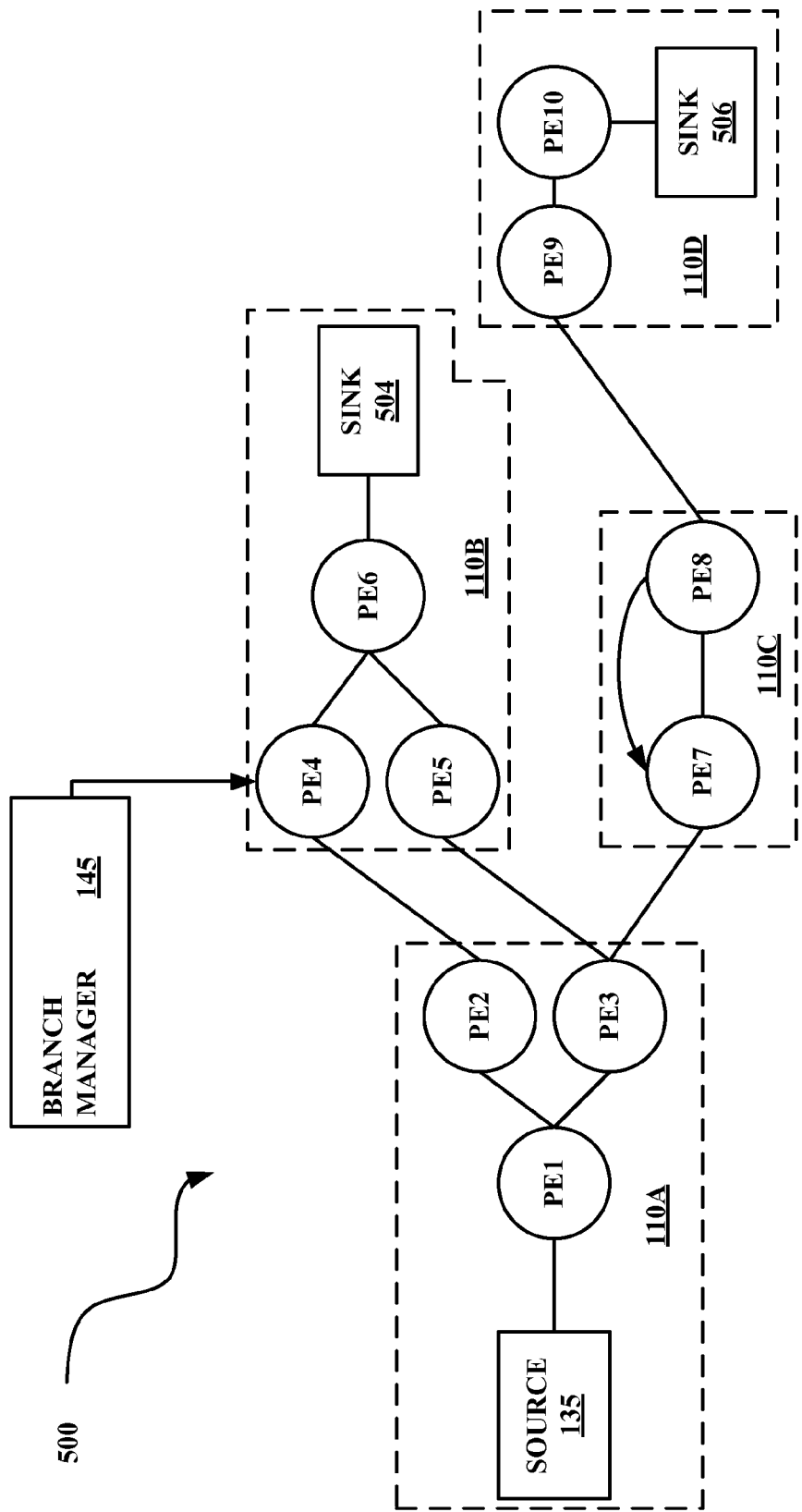
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

Each processing element may have a branch manager 145. A processing element may communicatively couple to the branch manager 145 so that the branch manager can decide how to route the stream of tuples. The operator graph 132 can encompass one or more processing elements, e.g., PE2 and PE4 from FIG. 5, which may lie on more than one compute node, e.g., 110A and 110B. In various embodiments, the processing branch can encompass more than one compute node. The branch manager 145 can receive performance data from a tuple that was processed with a particular routing method on a particular processing branch. The branch manager 145 can modify the routing method in response to the performance data, which can further be adjusted based on the compute node. For example, if the performance data indicates a processing time from PE3 to PE6 of 10 ms, but compute node 110B has 30% slower performance than compute node 110A, then the branch manager 145 can avoid sending as many tuples to processing branches on 110B.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
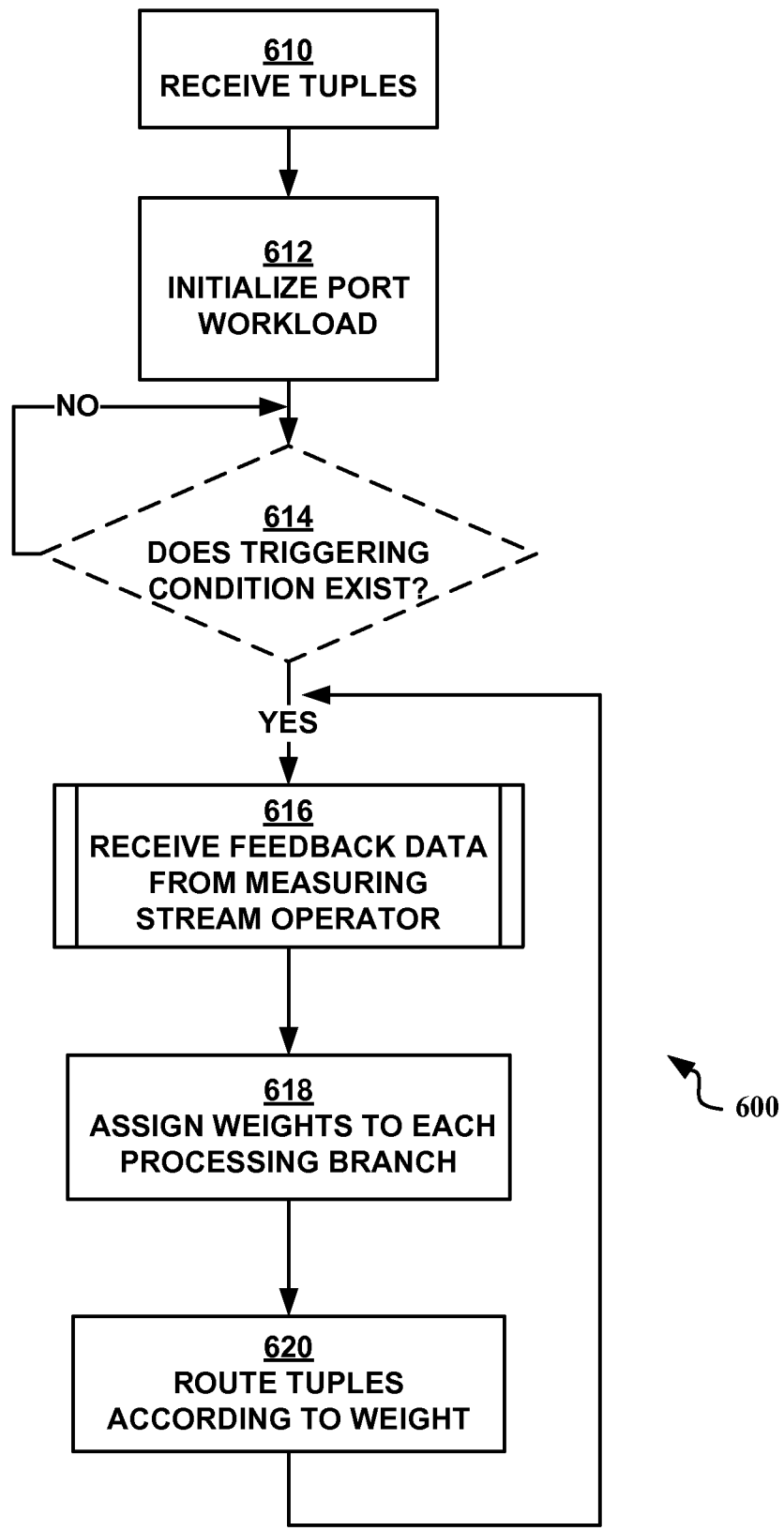
FIG. 6 illustrates a flowchart of a method for managing a stream of tuples from a split operator, according to various embodiments.

FIG. 6 illustrates a flowchart of a method 600 for managing a stream of tuples from a split operator, according to various embodiments. The method 600 can begin at operation 610. In operation 610, the split operator can receive a stream of tuples. The stream of tuples can be received from an upstream operator that performs a particular type of processing on each tuple from the stream of tuples. After the tuples are received, then the method 600 can continue to operation 612.

In operation 612, the split operator or the branch manager can initialize the port workload on the split operator. The split operator can have two or more output ports to route to various processing branches. In various embodiments, the split operator can have an initial state that ensures an even distribution of tuples between the various processing branches. In one example, the initial port workload direct tuples to processing branches in an alternating fashion. Thus, if there are two processing branches, a first processing branch and a second processing branch, then the split operator can route a first tuple to the first processing branch, a second tuple to the second processing branch, and a third tuple to the first processing branch, and so forth, evenly. In various embodiments, operation 612 can take place before or simultaneously with operation 610. After the ports are initialized, then the method 600 can continue to operation 614.

In operation 614, the split operator can monitor if a triggering condition exists. The triggering condition can be an event that initiates the analysis of the performance data from a measuring stream operator. In various embodiments, the triggering condition can be activated by the application. The triggering condition can also be based off of a high limit signal from the measuring stream operator. For example, the triggering condition can be present when a processing branch has a processing time of a certain percentage above another processing branch. In various embodiments, operation 614 can be considered optional and the tuple routing function can be considered to be always on. Assuming that the triggering condition is met, then the method 600 can continue to operation 616.

In operation 616, the split operator can receive the feedback data from the measuring stream operator. In various embodiments, the branch manager can communicate with the split operator in order to assign the weights in operation 618. The feedback data can be recorded from the measuring stream operator as discussed herein. After the split operator receives the performance data, then the method 600 can continue to operation 618.

In operation 618, the split operator or branch manager can assign different weights to each processing branch. The weights can affect how many tuples are processed by each processing branch. For example, if a first processing branch has a higher weight than a second processing branch, then the first processing branch can receive a greater number of tuples. The weights can be assigned based on the past performance of other tuples. For example, if the 5 tuple moving average processing time of a first processing branch is 5 ms, and the 5-tuple moving average processing time of a second processing branch is 10 ms, then the split operator can predict that the second processing branch is backlogged. The split operator can assign the output port that leads to the second processing branch a lower weight.

Various embodiments can have the split operator consider limiting factors from the performance data, e.g., file size, network latency, bottlenecks, or stream operators that request data from an external database, that cause a processing branch to have a slower processing time. Using the previous example with two processing branches, if a number of tuples on the second processing branch had abnormally large file sizes, then the weight of the second processing branch can be raised because of the lack of frequency of large file sizes. Likewise, the same can occur for rare attributes. In various embodiments, the presence of infrequent performance data can result in the split operator not modifying the weights to the processing branches. After the weights are assigned, then the method 600 can continue to operation 620.

In operation 620, the split operator can route the tuples from the stream of tuples to the processing branches according to weight. The split operator can employ a variety of routing methods in order to route the tuples to the processing branches. For example, the routing methods can include variations on the round-robin distribution, or load-balancing by routing blocks of tuples.

The round-robin distribution in the simplest form can include cycling tuples one at a time through each processing branch. Variations on the round-robin distribution can include cycling two or more consecutive tuples through one processing branch for every one tuple through another processing branch in an uneven fashion. The variation on the round-robin distribution can be beneficial where one processing branch has a higher weight than the other processing branch. For example, if a first processing branch has a weight of 3 and a second processing branch has a weight of 5, then the split operator can route five tuples through the second processing branch for every three tuples that go through the first processing branch. For more than two processing branches the routing based on weight can work in a similar manner.

Generally, the tuple routing can be performed by adding a greater number of tuples to be processed by the processing branch with the highest weight than the number of tuples to be processed by the processing branch with the lowest weight. For example, if there are three processing branches, a first processing branch with the highest weight and a third processing branch with the lowest weight, then the first processing branch can receive at least one more tuple to be processed for every tuple processed by the third processing branch. If the third processing branch receives two tuples, then the first processing branch can receive three tuples. The number of tuples added can be included into the round-robin cycle.

Load-balancing can involve routing a stream of tuples in a non-continuous manner. Such an arrangement can be beneficial where the underlying hardware elements of a compute node are variable, such as in a cloud computing environment. An example of load-balancing can include where a hardware element supports a first processing branch and a processing branch of another instance of an operator graph. The split operator can route tuples in blocks through the first processing branch and synchronize the tuples with the processing branch of another instance so that the hardware element does not receive simultaneous spikes of demand from all instances.

Once a routing method is selected by the split operator, then the stream monitor can monitor for the processing data and continuously optimize the routing in operation 616. In various embodiments, the split operator can modify the routing method by gradually increasing the number of tuples that flow through. For example, in a higher weight processing branch, the routing method can gradually change from receiving two tuples at a time to N tuples at a time to determine when performance would degrade past a threshold.

Figure 7:
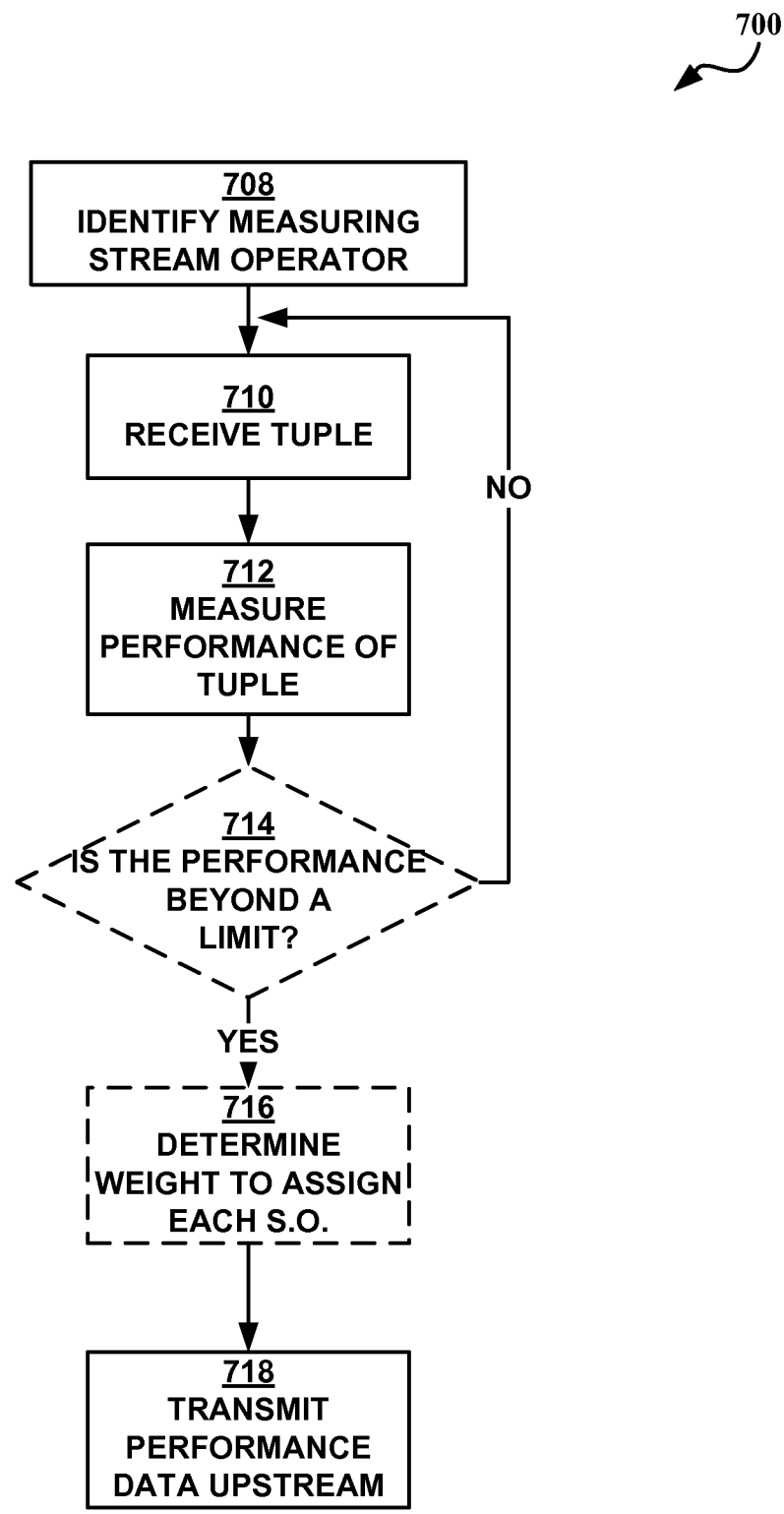
FIG. 7 illustrates a flowchart of a method of obtaining feedback data from a measuring stream operator, according to various embodiments.

FIG. 7 illustrates a flowchart of a method 700 of obtaining feedback data from the measuring stream operator, according to various embodiments. In various embodiments, the method 700 can correspond to operation 616 in FIG. 6. The measuring stream operator can communicate with the stream operator monitor. The stream operator monitor can be a subroutine of the stream manager. In various embodiments, the stream operator monitor can transmit the performance data obtained from the measuring stream operator to the split operator discussed herein. The method 700 can begin in operation 708.

In operation 708, the stream operator monitor can identify a measuring stream operator. The measuring stream operator can be any stream operator that measures an entire or the majority of a processing branch. For example, in a processing branch with three stream operators, a first stream operator, a second stream operator, and a third stream operator, the measuring stream operator can be the third stream operator assuming that the stream first travels to the first stream operator and the second stream operator.

The measuring stream operator can also be a stream operator that measures the most processing intensive task. Using the aforementioned example with the three stream operators, if the first stream operator accessed an external database, and the second and third stream operator performed non-intensive tasks, then the measuring stream operator can be at the second stream operator. In various embodiments, the measuring stream operator can be assigned by the application. Multiple processing branches can share the same measuring stream operator if the processing branches combine. Once the measuring stream operator is identified, then the method 700 can continue to operation 710.

In operation 710, the measuring stream operator can receive the tuples. In various embodiments, the tuples can include a timestamp of when they were processed by the split operator. After the tuple is received, the measuring stream operator can examine the performance of the tuple in operation 712. When received, the measuring stream operator can determine the time difference in order to gather performance data on processing time. The measuring stream operator can also communicate with the stream operator monitor to determine the other performance data associated with each tuple, e.g., a processing load, network latency, etc. The measuring stream operator can measure each individual tuple or groups of tuples. For example, the measuring stream operator can measure every 10 tuples to obtain a more representative sample of performance data. After the tuple is measured, then the method 700 can continue to operation 714.

In operation 714, the measuring stream operator can determine whether the performance is beyond a limit. For example, the performance can be beyond a limit if the limit is 5 ms for a processing time, but the performance of the processing branch is 6 ms. Operation 714 can be optional in various embodiments. The measuring stream operator can continuously output performance data depending on application preferences. If the performance is not beyond a limit, then the method 700 can continue to operation 710. Assuming that the performance is not beyond a limit, the measuring stream operator can discard the performance data measurement and continue processing the tuple. If the performance is beyond a limit, then the method 700 can continue to operation 716.

In operation 716, the weight of the processing branch can be determined. The weight can be based on a proportional formula to determine a numerical weight, according to various embodiments. For example, if the processing time of a first processing branch is 6 ms, a second processing branch is 9 ms, and a third processing branch is 11 ms, then the weight of the third processing branch can be 1 and the weight of the first processing branch can be 11 ms/6 ms=1.8. Operation 716 can optionally be performed by the measuring stream operator in place of the branch manager. After the weight of each processing branch is determined, then the method 700 can continue to operation 718.

In operation 718, the measuring stream operator can transmit the performance data to the split operator. According to various embodiments, the measuring stream operator can transmit the performance data to the stream operator monitor. The stream operator monitor can further transmit the performance data to the branch manager, which can determine how to route the incoming tuples to the split operator. The stream operator monitor can also transmit the performance data to the split operator.

Figure 8:
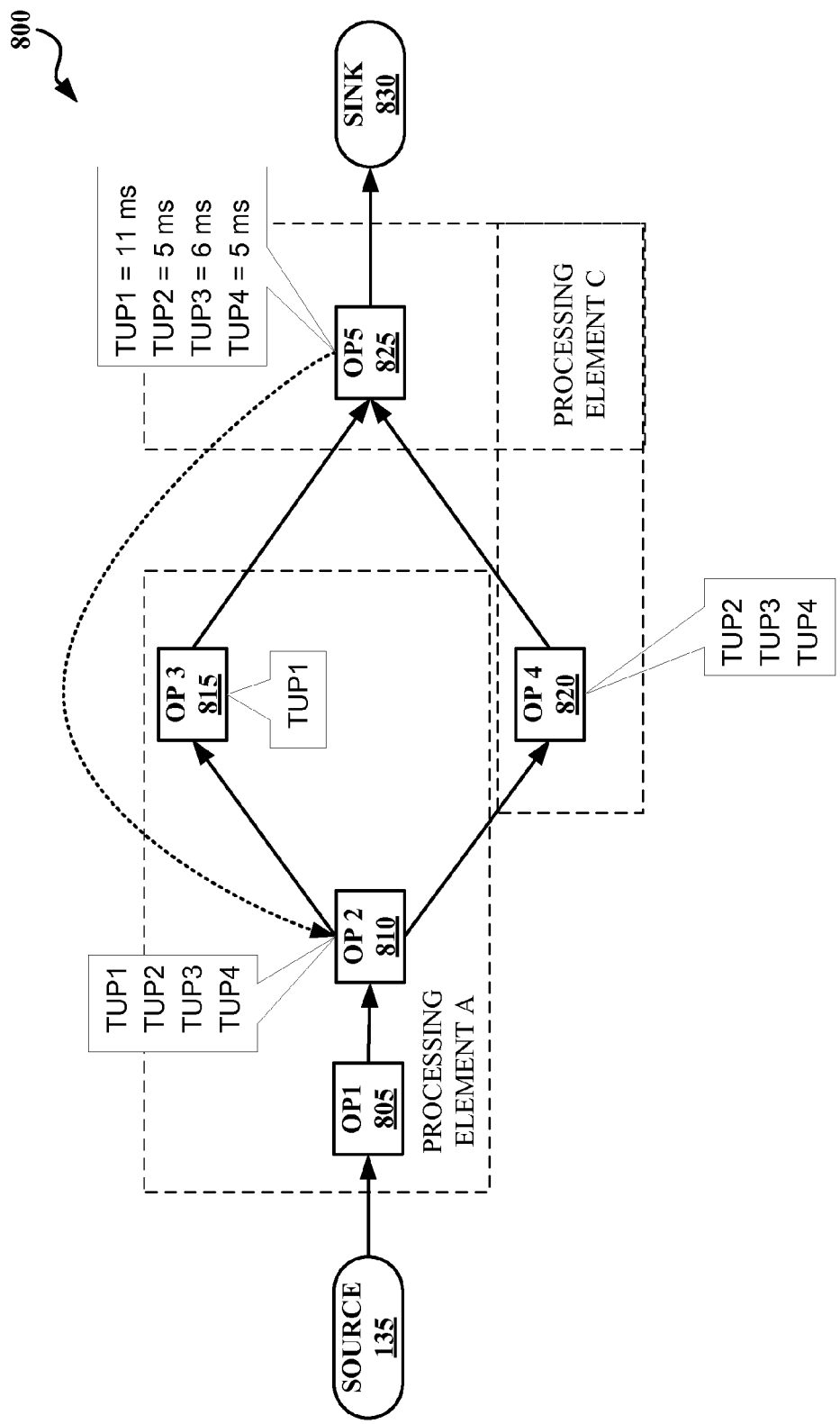
FIG. 8 illustrates an operator graph that uses a tuple routing function, according to various embodiments.

FIG. 8 illustrates an operator graph 800 that uses the tuple routing function, according to various embodiments. The operator graph 800 can be one of many operator graphs 132 depicted on FIG. 1. The operator graph 800 can have one or more tuples originating from a source 135 and being processed by stream operator (OP1) 805, and being split by split operator (OP2) 810 to be processed by two or more processing branches, i.e., OP3 815, OP4 820. The two processing branches can be merged into stream operator OP5 825.

The processing branches are depicted as having one stream operator each but the processing branches can contain one or more stream operators. The first processing branch can include OP3 815 while the second processing branch can include OP4 820. The first and second processing branches can be either duplicative or non-duplicative. In a non-duplicative processing branch configuration, the first processing branch can have a different output than the second processing branch. For purposes of illustration, the duplicative configuration is shown where the first processing branch matches the output of the second processing branch.

Stream operator 805 transmits a tuple to a split operator, stream operator 810. Stream operator 810 transmits to both stream operator 815, and stream operator 820 which further transmit tuples to stream operator 825. Stream operator 825 transmits the tuple to the sink 830.

The stream operator 825 can be the measuring stream operator and transmit the performance data back to the split operator 810. The stream operator monitor 140 can examine the performance of the tuples at OP5 825 and determine whether to transmit the performance data to OP2 810.

In the operator graph 800, the split operator, OP2 810 can receive four tuples, TUP1, TUP2, TUP3, and TUP4. As an initial state, TUP1 can be processed by the first processing branch while TUP2, TUP3, and TUP4 can be processed by the second processing branch. OP5, the measuring stream operator, 825 can determine the performance data of the tuple. For example, the measuring stream operator 825 can read the timestamp of each tuple and derive a processing time. The processing times can indicate that TUP1 is processed in the same amount of time as TUP2 and TUP3. The performance data can be sent back to OP2 810 and the branch manager can make the determination of maintaining the weight of each processing branch.

The branch manager can also include the performance data of hardware resource load. As depicted, OP1 805, OP2 810, and OP3 815 access the hardware resources of processing element A. OP4 820 and OP5 825 can access the hardware resources of processing element C. The burden on the hardware resource can also be measured by the measuring stream operator or by the stream manager 134. The branch manager can modify the tuple routing based on the load on a hardware resource. For example, if processing element A is 40% utilized, and processing element C is 90% utilized, then the branch manager can give more weight to the first processing branch, raising overall system utilization to 80% for the system running processing element A, reducing weight on processing element C, to reach system utilization targets of 80% for a cluster without impacting overall throughput of the application.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A system for processing a stream of tuples, each tuple having one or more attributes, comprising:
   one or more processing elements operating on a compute node having one or more computer processors, the one or more processing elements configured to processes the attributes from the stream of tuples as a single instance, each processing element having one or more stream operators;
   a split operator from the one or more processing elements configured to route the stream of tuples, using a routing method, through a plurality of processing branches, each processing branch having one or more stream operators, wherein a first processing branch of the plurality of processing branches is configured to perform a particular type of processing and produce a different processing result from a second processing branch of the plurality of processing branches, a stream operator configured to perform processing independent from another stream operator;
   a measuring stream operator that is configured to:
      receive the stream of tuples from one or more processing branches from the plurality of processing branches;
      measure performance data of each tuple from the stream of tuples;
      determine a weight to assign to each processing branch based off of the performance data;
      determine the routing method for the split operator based off of the weight; and
      transmit the routing method to the split operator.

2. The system of claim 1, wherein determine the weight comprises:
   determine whether the measured performance data is beyond a limit; and
   determine the weight in response to the measured performance data being beyond the limit.

3. The system of claim 1, wherein the performance data includes a processing time.

4. The system of claim 1, wherein determine the routing method includes:
   receive the weight of each processing branch;
   determine the processing branch having a highest weight relative to the plurality of processing branches and the processing branch having a lowest weight relative to the plurality of processing branches; and
   add a greater number of tuples to be processed by the processing branch with the highest weight than the number of tuples to be processed by the processing branch with the lowest weight.

5. The system of claim 1, wherein the measuring stream operator occurs after a substantial bottleneck in the first processing branch.

6. The system of claim 2, wherein the substantial bottleneck is defined by a rate of tuples.

7. The system of claim 1, wherein the split operator is further configured to determine the routing method for the split operator by initiating a round-robin routing method to cycle a first tuple from the stream of tuples through the first processing branch and a second tuple from the stream of tuples through the second processing branch.

8. The system of claim 1, where the wherein the measuring stream operator is further configured to route of the stream of tuples to generate an even processing time between the first processing branch and the second processing branch.

9. The system of claim 1, wherein the measuring stream operator is further configured to measure performance data of each tuple from the stream of tuples in response to a triggering condition, the triggering condition is an event that initiates an analysis of performance data from the measuring stream operator.

10. The system of claim 9, wherein the triggering condition occurs in response to the first processing branch having a processing time of a certain percentage above the second processing branch.

11. The system of claim 1, wherein the weights are assigned based on the past performance of other tuples.

12. The system of claim 1, where in the measuring stream operator that is further configured to:
   synchronize the stream of tuples from the first processing branch with a stream of tuples from another processing branch running on another instance.

* * * * *